United States Patent [19]
Ghetzler

[11] Patent Number: 5,505,587
[45] Date of Patent: Apr. 9, 1996

[54] RAM AIR TURBINE GENERATING APPARATUS

[75] Inventor: Richard Ghetzler, Buffalo Grove, Ill.

[73] Assignee: Northrop Grumman Corporation, Los Angeles, Calif.

[21] Appl. No.: 369,065

[22] Filed: Jan. 5, 1995

[51] Int. Cl.[6] .................................................. F01D 17/00
[52] U.S. Cl. .......................... 415/49; 415/144; 415/147
[58] Field of Search .................................... 415/144, 145, 415/147, 4.3, 4.5, 49; 244/58

[56] References Cited

U.S. PATENT DOCUMENTS

| | | |
|---|---|---|
| 2,632,295 | 3/1953 | Price ............................... 415/147 |
| 2,831,627 | 4/1958 | Brunner . |
| 2,850,226 | 9/1958 | Lundquist ........................ 415/147 |
| 2,850,227 | 9/1958 | Wheatley . |
| 3,075,742 | 1/1963 | Aldag . |
| 3,297,307 | 1/1967 | Jahns . |
| 3,386,368 | 6/1968 | Fielding . |
| 3,504,986 | 4/1970 | Jackson . |
| 3,588,268 | 6/1971 | Hampton . |
| 3,719,428 | 3/1973 | Dettmering ....................... 415/147 |
| 3,747,341 | 7/1973 | Davis . |
| 3,972,642 | 8/1976 | Fricke et al. . |
| 3,994,620 | 11/1976 | Spraker, Jr. et al. . |
| 4,012,165 | 3/1977 | Kraig . |
| 4,086,761 | 5/1978 | Schaut et al. . |
| 4,175,384 | 11/1979 | Wagenknecht et al. . |
| 4,409,788 | 10/1983 | Nash et al. . |
| 4,587,803 | 5/1986 | Nightingale et al. . |
| 4,679,982 | 7/1987 | Bouiller et al. . |
| 5,083,723 | 1/1992 | Grieb et al. . |
| 5,113,649 | 5/1992 | Siedlecki, Jr. . |
| 5,182,905 | 2/1993 | Stransky et al. . |
| 5,184,461 | 2/1993 | Stransky et al. . |

FOREIGN PATENT DOCUMENTS

| | | |
|---|---|---|
| 1186663 | 8/1959 | France . |
| 61-132780 | 6/1986 | Japan ............................ 415/4.3 |
| 2059515 | 4/1981 | United Kingdom . |

*Primary Examiner*—Edward K. Look
*Assistant Examiner*—James A. Larson
*Attorney, Agent, or Firm*—Terry J. Anderson; Karl J. Hoch, Jr.

[57] ABSTRACT

A ram air turbine generator comprises a cylindrical external fairing having bypass exhaust orifices adjacent the leading end and external exhaust ports adjacent the aft end. A central flow guide is coaxially mounted and has a contoured outer surface spaced from the external fairing. A valve tube is coaxial with, and intermediate, the external fairing and the central flow guide and extends between a nose end with openings nearest the leading end of the external fairing and an aft plate. The valve tube also has a plurality of aft internal exhaust ports generally coextensive with the aft external exhaust ports in the external fairing. The valve tube is spring biased to a first position at which its nose end is proximate the leading end of the fairing and blocks the bypass exhaust orifices such that air is caused to flow through an annular nozzle defined between the valve tube and the central flow guide, through a turbine wheel, then out to the surrounding region through the aft internal and external exhaust ports. Ram air is effective to move the valve tube to a second position so as to expose the bypass exhaust orifices enabling substantial flow of bleed air therethrough. Additionally, a nozzle flow control mechanism is operable in response to movement of the valve tube between the first and second positions.

9 Claims, 4 Drawing Sheets

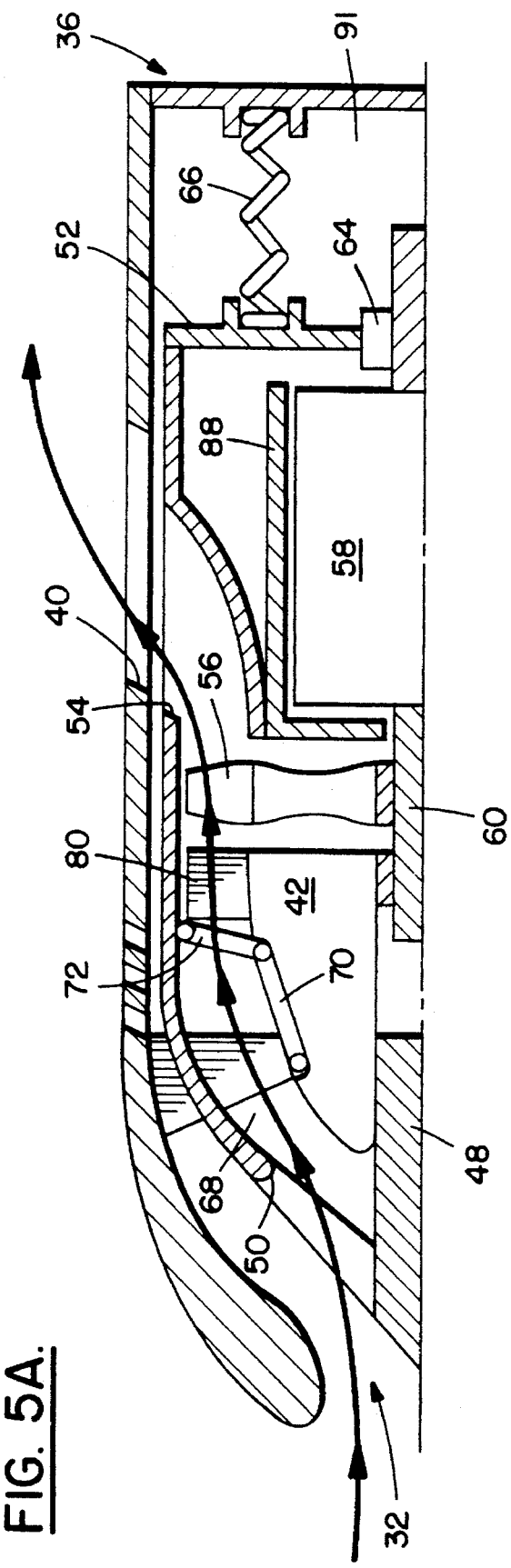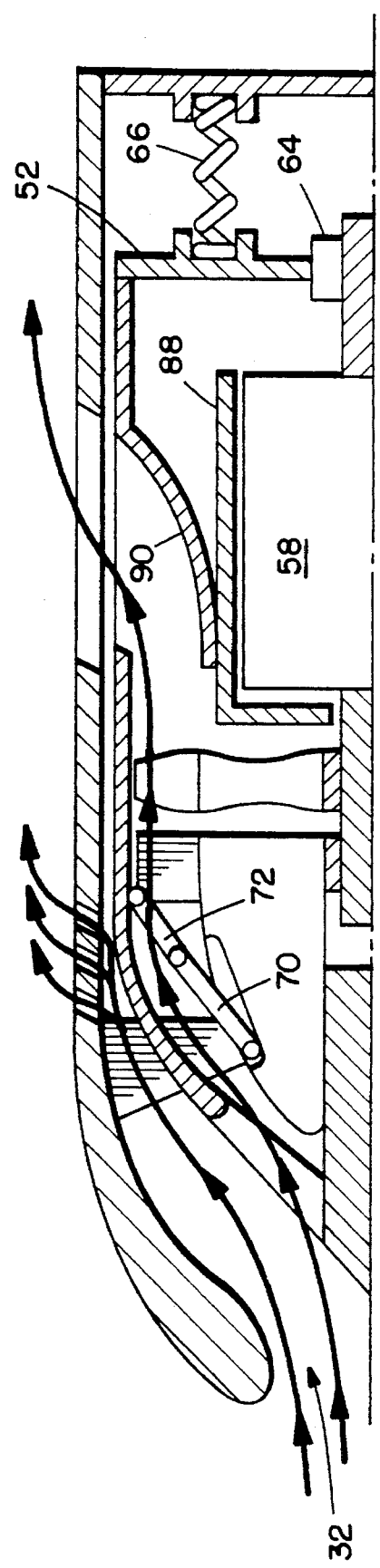
FIG. 5A.
FIG. 5B.

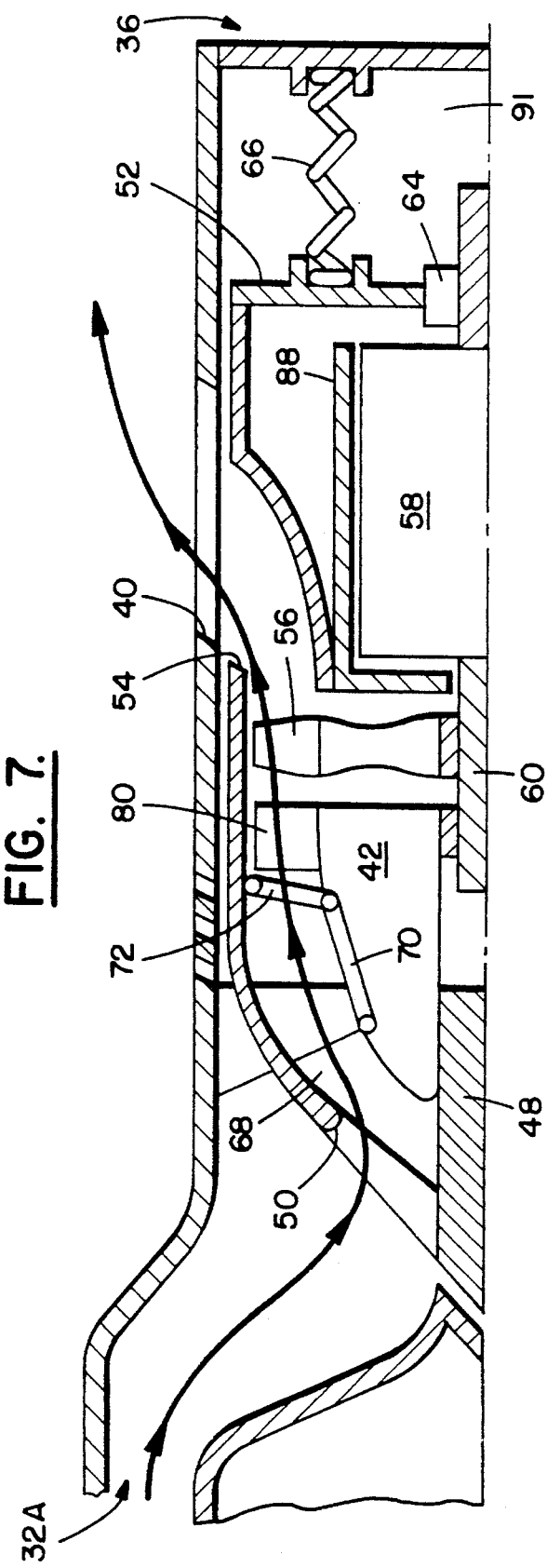
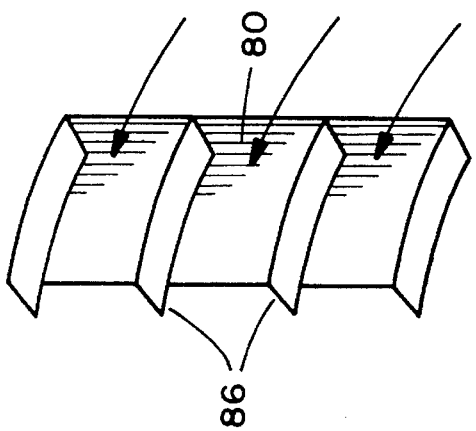

RAM AIR TURBINE GENERATING APPARATUS

BACKGROUND OF THE INVENTION

1. Field of the Invention

The present invention relates generally to ram air turbine generating devices and, more particularly, to an improved ram air turbine generator, which includes a unique air flow actuated air bypass valve, which together with the inlet diffuser, limits variations in the dynamic fluid power of the air flow passing through the turbine wheel, thereby limiting variations in fluid power transferred to the turbine blades. Operational capability for subsonic, transonic and supersonic flight is a primary feature of the invention.

2. Description of the Prior Art

It has long been a goal of designers of ram air turbine generating devices to minimize variations in turbine speed and power output of the generator and prevent generator overspeed and overheating. Failure to do so would require substantially greater design margins in the generator capacity to accommodate the complete range of altitude and flight speed of the flight vehicle in which the ram air turbine generator is mounted.

Also, in turbine devices, it is necessary to provide speed regulation to prevent a turbine wheel from attaining a speed at which the turbine disk or blades will fail. A common method which has been used in gas turbine engines to limit speed is that of absorbing power with a special turbine stage. This method has the disadvantage that efficiency losses result at normal operation conditions. Another method of speed control utilized a mechanical governor to detect excessive speed and this signal is used to actuate a control device which regulates the gas supply to the turbine. Even in gas turbine engine designs, it is apparent that a control which is more simplified than a governor-regulator system would be desirable.

One attempt at a simplified improvement is presented in U.S. Pat. No. 3,075,742 to Aldag which provided a turbine with a spring-biased shroud at the turbine blade tips so constructed that, at a predetermined speed, the shroud moves in response to reaction pressure forces and enables the gasses to move radially to give less effective gas flow for speed reduction.

More recent attempts to provide bypass valve assemblies for gas turbine engines are disclosed in U.S. Pat. Nos. 5,184,461 and 5,182,905 to Stransky et al., and 5,113,649 to Seidlecki, Jr.

Flow control devices associated with turbochargers are disclosed, for example, in U.S. Pat. No. 3,994,620 to Spraker, Jr., et al. and in UK Patent Application GB 2,059,515 to Melzer.

Other fluid driven turbine machines with fluid venting capability are disclosed in U.S. Pat. Nos. 5,083,723 to Grieb et al. and 3,504,986 to Jackson.

A common example of a fluid control device is disclosed in U.S. Pat. No. 3,386,368 to Fielding which is directed to a ventilator with a damper movable between open and closed positions.

It was in light of the state of the technology as just discussed that the present invention was conceived and has now been reduced to practice.

SUMMARY OF THE INVENTION

According to the invention, a ram air turbine generator has been devised which includes a unique air flow actuated air bypass valve. Together with the inlet diffuser, this bypass valve limits variations in the dynamic fluid power of the air flow passing through the turbine wheel, thereby limiting variations in fluid power transferred to the turbine blades. The effect is to minimize variations in turbine speed and power output of the generator and prevent generator overspeed and overheating thereby limiting the required design margins in generator capacity, throughout the complete range of altitude and flight speed of the flight vehicle in which the ram air turbine generator is to be mounted. Operational capability for all normal flight regimes, that is, for subsonic, transonic and supersonic flight is a feature of the invention.

The ram air turbine described herein was conceived to provide onboard power to towed flight vehicles with subsonic through supersonic mission requirements in mind, including towed decoys where onboard power is required or desirable. The present invention accomplishes this function without use of externally powered actuators, sensors and associated controls, and offers significant advantages in terms of size, weight, and cost, in comparison to other systems which require their use. Additionally, present ram air turbine technology which utilizes variable pitch turbine blades with their attendant mechanisms for speed control would be complex and expensive to reduce to small diameter applications. In addition to the towed air vehicle applications, the invention may prove useful in larger applications in any powered flight vehicle including missiles, either internally or externally mounted.

A primary object of the present invention is to provide a ram air turbine generator comprising an external aerodynamic fairing which will withstand internal ram air pressures that are developed under flight conditions, a ram air inlet diffuser, a fixed center flow deflector, a turbine generator, means defining a variable area annular converging nozzle passage which communicates between the diffuser and turbine for controlling the air flow from the diffuser to the turbine efficiently with small flow losses, means for varying the quantity of the inlet air flow which bypasses the turbine and which exhausts from the diffuser directly into the external air stream, means for minimizing the variations of the momentum in the air flow supplied through the said annular nozzle to the turbine from the diffuser, with changes in the air inlet conditions, means for minimizing velocity variation in the air flow supplied through the said annular nozzle to the turbine from the diffuser with changes in the air inlet conditions, and means for minimizing variations in the fluid dynamic power of the air flow transferred to the turbine generator for changes in air inlet conditions.

Another object is to provide such a ram air turbine in which the variable area annular converging nozzle communicates between the inlet diffuser and turbine and is comprised of: an axially movable assembly positioned inside of said aerodynamic fairing, and wherein the axially movable assembly forms the outer wall of the annular nozzle which connects the diffuser to the turbine, and the forward part of the annular nozzle is formed in the passage between a fixed center flow guide and the aft surface of the forward part of the axially movable assembly, and whereby the annular passage is reduced when the axially variable assembly moves aft and toward the fixed center flow guide, and increased when the axially movable assembly moves forward and away from the fixed center flow guide; wherein the inner surface of the aft portion of the said annular nozzle is comprised of the outer surface of a plurality of annular doors, wherein the forward end of each door is attached to hinges mounted to the center flow guide and a linkage is mounted to the aft end of each door and the other end of the linkage is mounted to the inner surface of the axially movable assembly, whereby axial motion of the axially movable assembly acts on the linkages which in turn close the doors when the axially movable assembly moves aftward, and which open the doors when this assembly moves forward. In attaining this objective, the geometry of the center flow guide, the inner surface of the axially movable assembly, the positioning of the door hinge and linkage attachment from the door to the axially movable assembly are such that a minimum flow area is presented in the nozzle exhaust, for fully open to the maximum closed position of the annular doors, thereby forming a converging nozzle for all positions of the axially movable assembly and corresponding position of the annular doors, and wherein the nozzle flow exhaust area is increased or decreased in proportion to the axial motion of the movable assembly and wherein the fully open position of the doors presents a total flow area equal to the inlet area of the inlet diffuser.

A further object of the invention is to provide such a ram air turbine in which the means for varying the portion of the inlet air flow which bypasses the turbine comprises an axially movable assembly wherein the outer circumference of the axially movable assembly covers or uncovers bypass orifices in the aerodynamic fairing in front of the axially movable assembly, thereby controlling that part of the inlet air flow which bypasses the variable area annular nozzle, thereby bypassing flow through the turbine.

Still a further object of the invention is to provide such a ram air turbine in which the means for minimizing variations of momentum in the air flow supplied to the turbine comprises the axially movable assembly, wherein the axially movable assembly is spring loaded in compression to the rear structure of the ram air turbine and wherein the axially movable assembly includes an aft flow deflector which deflects air flow exhaust from the turbine outward with a radial velocity component, thereby creating a reaction force in the aft direction which is proportional to the momentum of the air flow through the variable area nozzle, and whereby the difference between the aft acting force on the front surface of the axially movable assembly, which is exposed to the full recovery pressure in the diffuser, and the forward acting force of the annular variable nozzle which is exposed to the static pressure close to free stream pressure, the difference in this net aft force being in proportion to the total momentum of the air flow entering the inlet diffuser minus the momentum of the air flow passing through the annular nozzle, whereby the total force acting on the front of the axially movable assembly when added to the force acting on the rear of the assembly is proportional to the total momentum of the air flow entering the inlet diffuser, whereby the aft deflection of the movable assembly is thereby proportional to the total momentum of the air flow entering the inlet diffuser and wherein the total flow area of the annular nozzle is inversely proportional to the position of the movable assembly, whereby the total momentum of the air flow through the variable area annular nozzle is maintained, with small variation, with changes in the air inlet conditions.

Yet a further object of the invention is to provide such a ram air turbine in which the mechanism for minimizing velocity variations in the air flow supplied through the said variable area annular nozzle comprises the variable area annular nozzle wherein the axial motion of the axially movable assembly varies the nozzle exhaust flow area from a maximum equal to that of the ram air inlet, down to the minimum as determined by the desired design bypass ratio; and wherein the total uncovered area of the said bypass orifices, when added to the total exhaust area of the variable area annular nozzle, will for all axial positions of the axially movable assembly, be equal to that of the ram air inlet, whereby the velocity of the air flow through the orifices and annular nozzle exhaust will thereby be established at the same velocity as the air flow through the ram air inlet for up to Mach 1.0 flight and whereby the inherent character of the annular converging subsonic nozzle provides flow choking for inlet diffuser pressures resulting from flight above Mach 1.0, thereby limiting the maximum exhaust velocity of the annular nozzle to Mach 1.0, whereby flight conditions from a prescribed high subsonic flight condition through supersonic flight conditions results in changes in annular nozzle exhaust velocity from the high prescribed subsonic velocity to a maximum of Mach 1.0, thereby minimizing annular nozzle velocity variations within the range for flight conditions varying from high subsonic through supersonic flight conditions.

Still another object of the invention is to provide such a ram air turbine in which the mechanism for minimizing the variations in fluid dynamic power of the air flow through the turbine comprises the means to minimize the variation in momentum of the air flow through the turbine and the means to minimize variation of velocity of the air flow through the turbine, and whereby the fluid dynamic power of the air flow passing through the variable area annular nozzle and through the turbine is proportional to the product of the momentum and velocity of the air flow, and whereby the turbine of the preferred embodiment of this invention is of the reaction type whereby small variations in turbine efficiencies occur within the limits of the range of velocity, such that variations of the fluid power in the air flow through the turbine, and the power transferred to the turbine will be minimized, with variations being less than a small fraction of the total variation in fluid dynamic power of the air flow entering the inlet diffuser, corresponding to the range of air inlet conditions produced during subsonic through supersonic flight speeds and sea level to high altitude operation.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numbers refer to like parts throughout the disclosure.

BRIEF DESCRIPTION OF THE DRAWINGS

FIGS. 5A and 5B are longitudinal half cross section views, generally similar to FIG. 3, illustrating, respectively, different relative positions of components within the device of the invention;

FIG. 6 is a detail perspective view of a component of the invention; and

FIG. 7 is a longitudinal half cross section view, similar to FIGS. 5A and 5B illustrating another embodiment of the invention.

Figure 1:
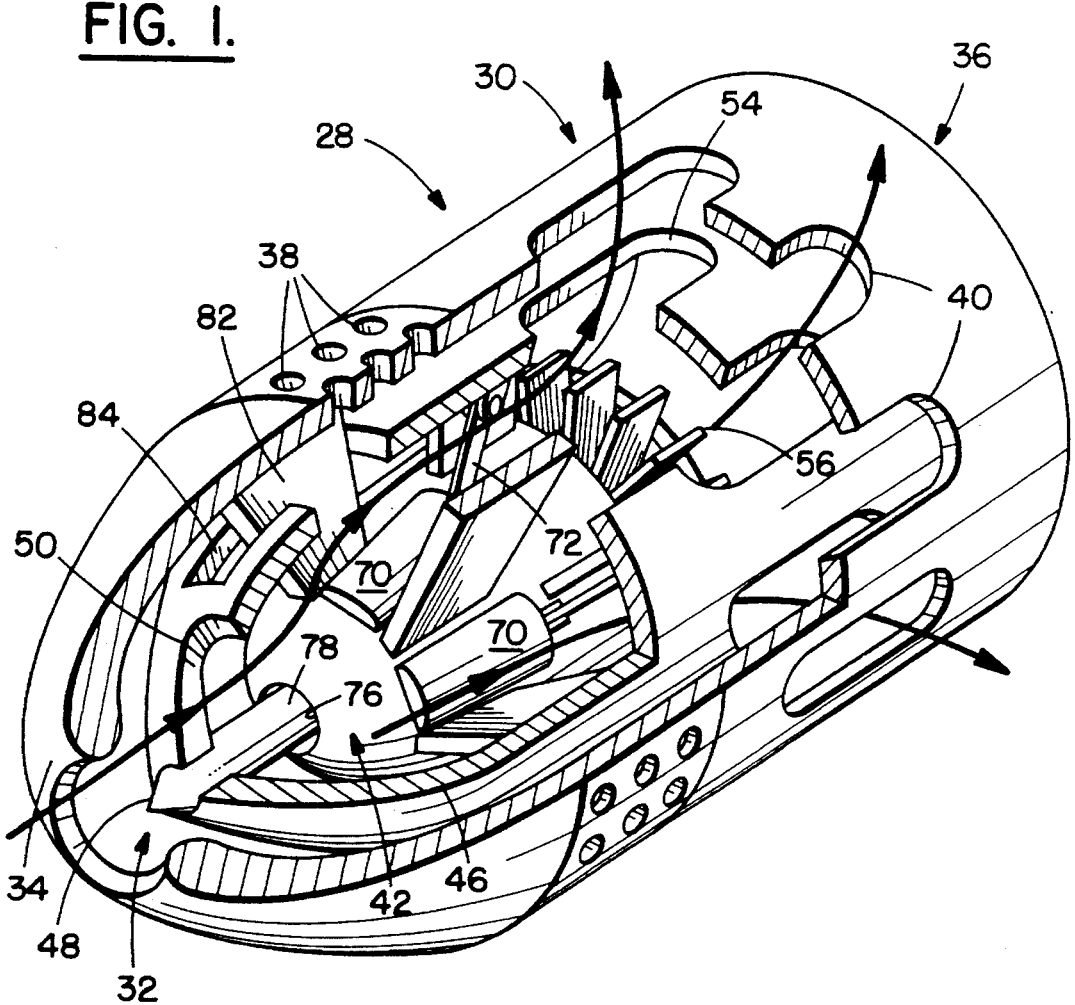
FIG. 1 is a perspective view of a ram air turbine generating device embodying the invention, certain parts being cut away and shown in section.
Figure 2:
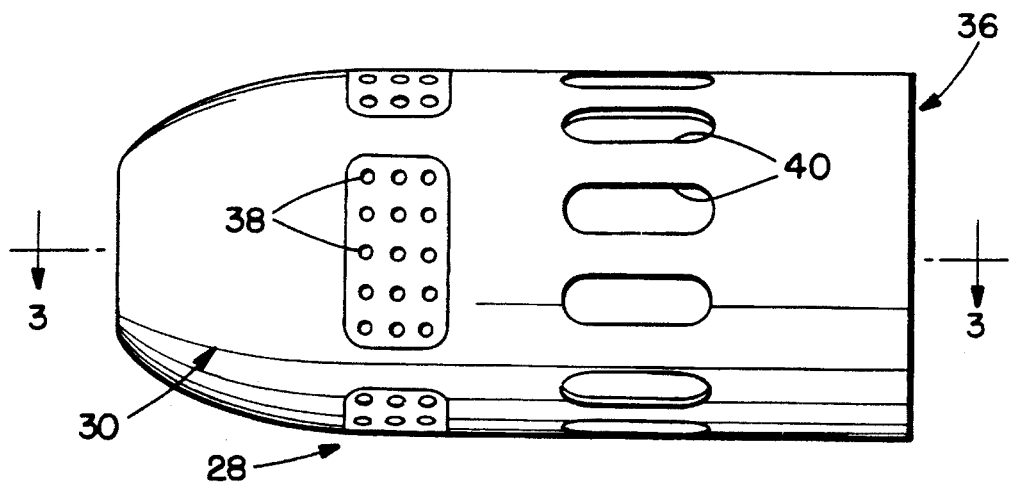
FIG. 2 is a side elevation view of the device illustrated in FIG. 1.

DETAILED DESCRIPTION OF THE
PREFERRED EMBODIMENT

Turn now to the drawings and, initially, to FIGS. 1–4 which illustrate most clearly the overall construction of the ram air turbine generating device 28 embodying the present invention. The device 28 comprises a generally cylindrical external fairing 30 extending between an inlet passage or diffuser 32 at a leading end 34 and an aft end 36 and having a plurality of bypass exhaust orifices 38 adjacent the leading end and a plurality of external exhaust ports 40 adjacent the aft end. A central flow guide member 42 is mounted on the external fairing 30 and is coaxial with the fairing and has a contoured outer surface 44 spaced from the external fairing. A valve tube 46 is positioned intermediate, and coaxial with, the external fairing 30 and the central flow guide member 42. The valve tube extends between a nose end 48 having a plurality of openings 50 therein nearest the leading end 34 of the external fairing 30 and an aft plate 52 spaced from the aft end 36 of the external fairing. The valve tube has a plurality of aft internal exhaust ports 54 generally coextensive with the aft external exhaust ports 40 in the external fairing 30. A turbine wheel 56 is drivingly coupled to a generator 58, both being mounted on a generator shaft 60. The generator shaft is rotatably mounted at one end in a forward bearing 62 on the central flow guide member 42 and at the other end in an aft bearing 64 on the aft plate 52 of the valve tube 46.

The generator shaft 60 and the aft bearing 64 are slidable relative to each other to accommodate movement of the valve tube 46 between a first position (FIG. 5A) at which the nose end 48 of the valve tube 46 is proximate the leading end 34 of the external fairing 30 and a second position (FIG. 5B) at which the nose end is distant from the leading end. One or more compression springs 66 or other suitable resilient devices are interposed between the aft plate 52 and the aft end 36 to bias the valve tube to the first position. In the first position with the nose end 48 of the valve tube 46 proximate the leading end 34 of the fairing 30, the valve tube blocks the bypass exhaust orifices 38 such that air is caused to flow through the inlet passage or diffuser 32, through an annular nozzle 68 defined between the valve tube and the central flow guide member, through blades of the turbine wheel 56, then out to the surrounding region through the aft internal exhaust ports 54 and the aft external exhaust ports 40. The valve tube is movable to the second position by the force of air acting on the nose end 48 thereby exposing the bypass exhaust orifices such that substantial flow of air occurs therethrough with a lesser flow through the annular nozzle, through the turbine wheel, then out to the surrounding region through the aft internal exhaust ports and the aft external exhaust ports.

A plurality of nozzle control members are positioned intermediate the valve tube and the central flow guide member and are operable to control flow of air through the nozzle 68 in response to movement of the valve tube between the first and second positions. More specifically, the nozzle control members include circumferentially spaced control doors 70 pivotally mounted to the contoured outer surface 44 of the central flow guide member 42 for movement between retracted positions substantially contiguous with the outer surface 44 and extended positions projecting into the annular nozzle.

The control doors 70 are moved between the retracted and extended positions by a plurality of links 72, pairs of the links being pivotally mounted at one end to the valve tube and at an opposite end to one of the control doors. By reason of the links 72, each of the control doors 70 is held in the retracted position when the valve tube is in the first position and in the extended position when the valve tube is in the second position.

Figure 4:
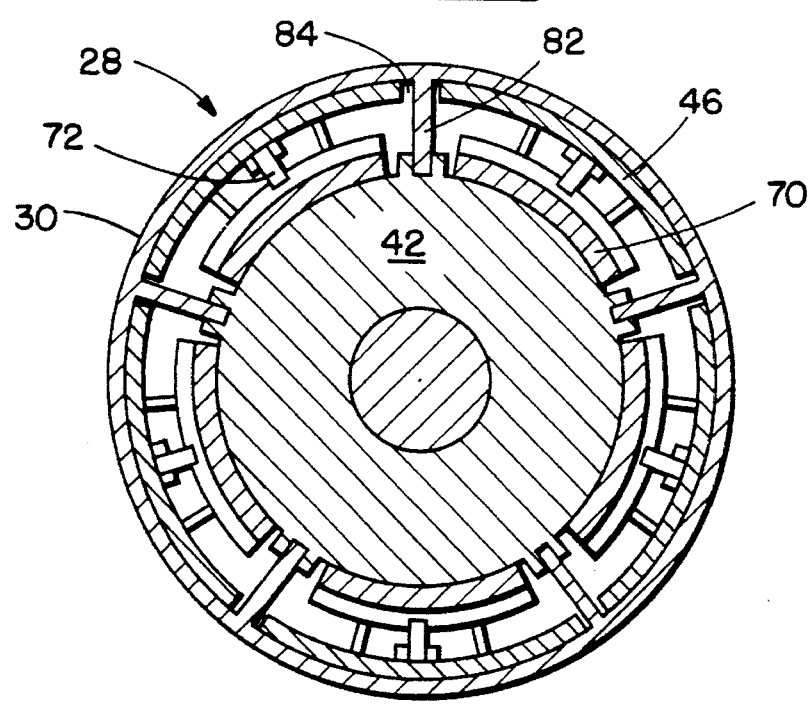
FIG. 4 is a cross section view taken generally along line 4—4 in FIG. 3.
Figure 3:
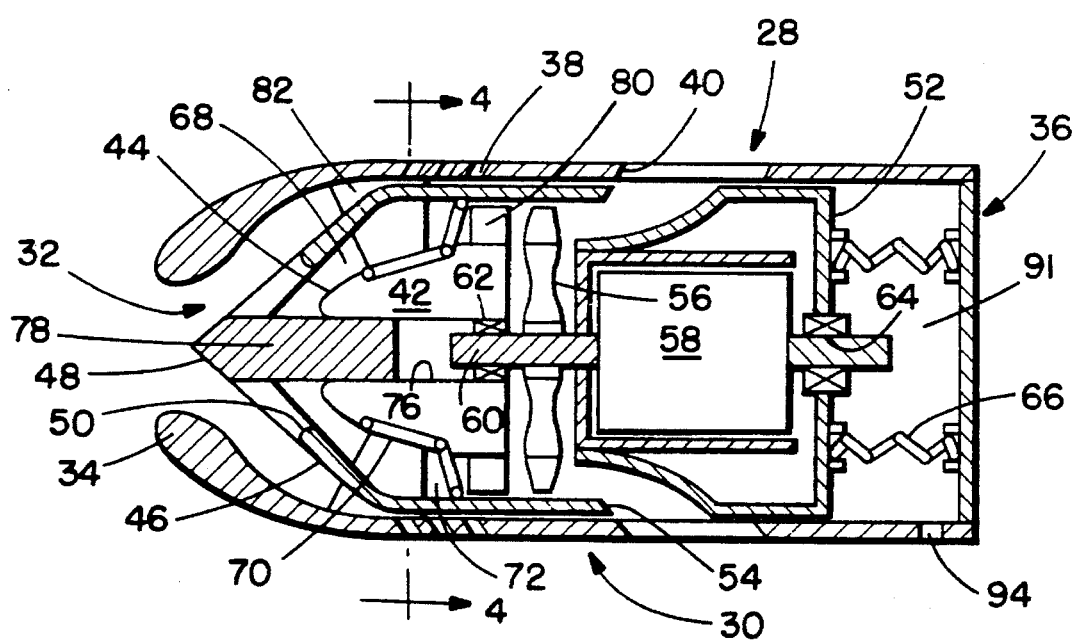
FIG. 3 is a cross section view taken generally along line 3—3 in FIG. 2.

As seen particularly well in FIGS. 1 and 4, the ram air turbine generating device 28 of the invention includes a key arrangement for preventing relative circumferential movement between the external fairing 30 and the valve tube 46 as the valve tube moves between the first and second positions. This result is achieved by means of support vanes 82 which extend through axial slots 84 in a manner which will be more fully described below.

Additionally, the central flow guide member 42 has an axial bore 76 therein and the valve tube has an integral centering shaft 78 slidably received in the axial bore. This construction assures that the relative relationship between the valve tube 46 and the external fairing 30 and the central flow guide member 42 is maintained throughout movement between of the valve tube between its first and second positions.

A plurality of guide vanes 80 are mounted circumferentially on the outer surface 44 of the central flow guide member 42 upstream of the turbine wheel 56 for efficiently guiding flow of the air through the turbine wheel.

As noted above, an axial side elevation view in section of the present invention is shown in FIG. 5A. At the maximum design altitude and at the minimum design speed at that altitude, the combination of conditions which will be referred to as the design condition, the ram air turbine internal components are positioned relative to the external fairing 30 as shown in FIG. 5A. After entering the inlet diffuser 32, the air passes through the openings 50 of the variable area annular nozzle 68, the front portion of which is formed in the passage between the aft surface of the valve nose end 48 and the front of the central flow guide member 42. The aft portion of the variable area annular nozzle 68 is formed in the passage between the inner surface of the valve tube 46 and the plurality of annular control doors 70, which are fully open under the design condition and which partially close, under the action of the links 72 which attach the annular control doors 70 to the valve tube 46 as the valve tube 46 translates in the aft direction. The nozzle converges with the annular control doors 70 providing the final reduction in area at the nozzle exhaust. The central flow guide member 42 is supported by a plurality of support vanes 82 which pass through axial slots 84 in the valve tube 46 shown in cross section in FIG. 4 which is a view looking aft from a section taken through FIG. 3. The support vanes 82 are attached to the inner wall of the external fairing 30. The annular control doors 70 are spaced between the support vanes 82, and seals (not shown) on the edge of the control doors mate with the vanes' surfaces, preventing air leakage.

Referring again to FIG. 5A, the air exits the variable area annular nozzle 68 and passes through a plurality of fixed, partitioned, guide vanes 80 which turn the flow in the direction of rotation of the turbine wheel 56 at an optimum angle from the turbine axis for the particular turbine design and turbine/generator design speed. Each of the guide vanes is partitioned into a plurality of radial sections by thin curved plates 86 as shown in FIG. 6. Air flow from the variable area annular nozzle 68 is shown entering one of the partitioned guide vanes in this figure. The air exits the vanes and then passes through the turbine 56 where a portion of the dynamic energy is extracted and transferred to the generator 58 through the turbine/generator shaft 60. The air exits the turbine wheel and is turned outward with low turbulence by a favorably shaped aft flow deflector 90, flows through the aft internal exhaust port 54 and aft external exhaust port 40, into the external airstream.

The valve tube nose end 48, the valve tube 46, the aft flow deflector 90 and the valve tube aft plate 52 together form one integral assembly. This assembly, which in its entirety is denoted the valve tube assembly, slides axially in the external fairing 30. The generator 58 is positioned as shown in a generator enclosure 88 with the aft shaft 60 extending through a bearing 64 which is mounted in the valve tube plate 52. An annular seal (not shown) located on the inner surface and front edge of the aft flow deflector 90 mates with the outer surface of the generator enclosure 88. The forward generator shaft 60 extends through a bushing or bearing (not shown) in the front of the generator enclosure 88, then passes through the turbine wheel hub where attachment is made to the turbine wheel and the end of the shaft 60 passes through the forward bearing 62 which is located in the axial center hole of the central flow guide member 42. Compression springs 66 located in an aft chamber 91 intermediate the aft plate 52 and the aft end 36, react the axial forces transmitted by the air flow to the valve tube assembly as the valve tube assembly is pushed backwards. The aft chamber vent 94, shown in FIG. 3 communicates between the aft chamber 91 and the external airstream, whereby the external airstream static pressure is impressed in the aft chamber 91 and whereby this pressure exerts a forward acting force on the aft surface of the aft surface of the aft plate 52. Accordingly, the net aft acting forces on the valve tube 46 are the dynamic forces induced by the internal airflow. As previously noted, the support vanes 82 and axial slots 84 cooperate to prevent relative rotation of the valve tube assembly and the external fairing 30. Alternatively, a plurality of keys (not shown) may extend axially along the outer surface of the valve tube 46 and fit into matching grooves (not shown) in the inner surface of the external fairing 30 so as to prevent rotation of the valve tube assembly relative to the external fairing 30.

For the design condition, the flow induced forces in the assembly are produced on the turbine blades by drag, and on the aft flow deflector 90 by reaction forces as the axial momentum of the air is reduced as the flow is turned outward by the flow deflector 90 prior to being exhausted. A significantly smaller portion of the total air flow induced force is transmitted to the valve tube by drag of the valve tube nose end 48 due to the favorable aerodynamic shape of the valve tube nose end 48. These forces compress the springs 66, resulting in the relative positions of the valve tube assembly relative to the other components in the ram air turbine as shown in FIG. 5A. As the flight speed of the ram air turbine generating device 28 increases above that of the design flight condition, or the flight altitude is decreased to below that of the design flight condition, or any combination of speed and altitude is attained so that the dynamic pressure given by one-half the product of the density and velocity squared is greater than the dynamic pressure developed under design condition, the flow induced forces on the valve tube assembly will cause additional axial translation of the valve tube assembly which will be reacted by additional compression of the springs 66.

As the valve tube 46 translates axially in the aft direction, the cross sectional exit flow area of the variable area annular nozzle 68 is reduced as the links 72, partially close the annular control doors 70. Simultaneously, the front outer circumference of the valve tube nose end 48 opens passageways from the diffuser 32 through the plurality of forward external bypass exhaust orifices 38, allowing a portion of the air to bypass the flow path through the turbine wheel and to exhaust directly through the orifices to the outside. At maximum dynamic pressure, which will be denoted the maximum bypass operating condition, the valve tube will be positioned as shown in the half axial sectional view of FIG. 5B with the resulting air flow paths as indicated. The central flow guide member 42 and the aft surface and inner wall of the valve tube 46 and the outer surface of the annular control doors 70 are arranged and contoured together to prevent flow separation and turbulence in the variable area annular nozzle 68 for the range of valve tube assembly positions corresponding to design condition operation through to maximum bypass operation. The nozzle converges, resulting in maximum velocities at the nozzle exit. These features allow high flow efficiencies in the variable area annular nozzle 68 at the design condition while also preventing fluid mechanic instabilities which could induce oscillations in the turbine blades during bypass operation. As the annular nozzle area is reduced, the exit air flow is admitted to a decreasing number of radial sections of the partitioned turning vane 80 which prevents the air flow from expanding radially inward, maintaining constant flow velocity from the turning vane inlet to exhaust.

The axial momentum of the air flow entering the inlet/diffuser 32 is proportional to product of the mass flow rate and the velocity of the air. In turn, the mass flow rate is proportional to the product of the inlet cross sectional flow area, the density and the velocity, Therefore, the momentum of the airstream flowing in the inlet is proportional to the product of the density, flow area, and the velocity squared. Under the zero bypass design condition, the majority of the air's momentum will be transferred to the turbine blades and aft flow deflector 90, producing the majority of the axial force. As the flight dynamic pressure increases and the momentum of the inlet airstream increases, pushing back the valve tube assembly and decreasing the flow area of the variable annular flow nozzle 68, while opening forward external bypass exhaust orifices 38 adjacent to the valve tube nose end 48 an increasingly larger portion of the total momentum in the internal airflow is transmitted to the front surface of the valve tube nose end 48.

The total force acting on the valve tube assembly is equal to the sum of these forward induced forces acting on the valve tube nose end 48 and the aft acting force on the turbine blades and the aft flow deflector 90. Each of these forces, and therefore the total sum of the forces, is proportional to the total momentum of the entering internal air flow. The resulting force on the valve tube assembly, deflection of the aft linear compression springs 66, and the resulting axial translation of the valve tube assembly, will therefore be proportional to the momentum of the entering air flow. The contours of the central flow guide member 42 and the aft surface of the valve tube nose and the relative lengths and positioning of the links 72 and hinges attaching the annular control doors 70 to the member 42 results in the cross sectional flow area of the variable area annular nozzle being decreased closely in proportion to the axial translation of the valve tube assembly and therefore decreased in proportion to the total momentum of internal airflow, as the total momentum of the internal airflow increases above that for the design condition.

Therefore, the total momentum of the airflow passing through the variable area annular nozzle 68, and through the blades of the turbine wheel 56 which is given by the product of the density, cross sectional flow area, and velocity squared, will remain approximately constant throughout the range of flight operational conditions as a result of these combined features.

For the specific drawings shown, the variable area annular passage 68 cross sectional flow area under the design condition, FIG. 5A, is three times greater than the area under maximum bypass conditions, as shown in FIG. 5B, and the design will be denoted a 3 to 1 area ratio. An increase in the radial dimension of the external surface of the central flow guide member 42 by one-half of the width of the variable area annular flow nozzle under full bypass operation as shown in FIG. 5B, will increase the area ratio to approximately 6 to 1. For the design with a 3 to 1 area ratio, an air density ratio of 3 to 1 is allowable at constant flight speed throughout a range of altitudes to maintain constant momentum in the air flow through the turbine wheel. Under standard atmospheric conditions, this corresponds to an allowable maximum design altitude of 33,000 feet, if sea level operation is desired at maximum bypass. For the design with an area ratio of 6 to 1, 48,000 feet is the maximum corresponding allowable design altitude if sea level operation is desired at maximum bypass. Additionally, if the sea level speed requirements are greater than for the design altitude, higher bypass ratios than 6 would be incorporated to accommodate the increased ratios of dynamic pressure from 48,000 feet down to sea level operation. The means to maintain constant momentum in the airflow through the variable area annular nozzle 68, and to the turbine wheel, under a desired range of altitude and speed considerations, is thereby claimed.

The fluid dynamic power of the air flow through the variable area annular passage 68 is equal to the product of the flow momentum and velocity divided by two, which is identical to the product of the air mass flow rate and the kinetic energy of the air flow, the later quantity given by one-half of the velocity squared. The efficiency in converting the fluid dynamic power to mechanical power is related to the nozzle shape, angle of the nozzle axis to the turbine blade, turbine blade size and shape, and the ratio of the rotational velocity of the turbine blades to the air flow from the nozzle, which is denoted the velocity ratio. Utilization of reaction type turbine blading will provide the flattest efficiency versus velocity ratio performance curves. For example, drops in efficiency of 10 percent or less, for increases in velocity ratio above the optimum by as much as 30 percent, have been obtained with reaction turbine design. In the preferred embodiment of the present invention, such a reaction turbine will be incorporated and the nozzle and turbine design matched so that the maximum efficiency is obtained under the design conditions.

Features of the invention to significantly limit changes in the nozzle exhaust air flow velocity throughout the range of subsonic through supersonic flight conditions is also claimed and an example is provided for illustration. A typical design condition is a Mach=0.80 flight speed at an altitude of 48,000 feet. For this design condition and a inlet/diffuser area selected, the variable area annular nozzle 68 exit area will be appropriately selected to reaccelerate the flow to Mach=0.8 at the nozzle exit. For a typical range of corresponding required flight conditions for the ram air turbine, flight Mach No. can vary from subsonic flights Mach=0.8, up to supersonic flight at Mach=1.5 at the design altitude of 48,000 feet.

At supersonic flight speeds, a normal shock will be formed in front of the inlet/diffuser 32 reducing the flow to subsonic velocities as the flow enters the inlet diffuser. For the example cited, as the flight Mach No. increases above the design speed of Mach=0.8, the increased momentum of the flow will force the valve tube assembly farther back, opening the bypass air flow path through the forward external bypass exhaust orifices 38, as previously described. The area of the uncovered orifices versus valve tube assembly position will be selected so that the sum of the uncovered orifice area and nozzle exhaust area is equal to the inlet area of the inlet/diffuser 32. Under these conditions, as the flight speed increases from Mach=0.8 to 1.0, the air velocity at nozzle exit and the bypass orifices will also increase from Mach= 0.8 to 1.0. As Mach= 1.0 flight speed is exceeded, flow in the orifices and the nozzle will remain choked and the nozzle exhaust velocity will therefore be limited to Mach=1.0 for all flight speeds above Mach=1.0.

The partitioned guide vanes 80 will have thinner profiles than the support vanes 82 allowing a corresponding proportional step reduction in the flow Mach No. in the guide vanes to acceptable subsonic levels before entering the reaction turbine blades. The maximum increase of 25 percent in the annular nozzle velocity for Mach=1.5 flight, compared with the design condition of Mach=0.8 resulting from a ratio of 1.0 to 0.8 nozzle exit Mach No. will therefore be maintained at the partitioned turning vane 80 exit and turbine blade inlets. Therefore, since constant momentum is maintained due to the reduction in annular nozzle area, the maximum increase in power input to the turbine/generator will be limited to 25 percent for this design example at 48,000 feet flight altitude. This is to be compared to about 660 percent increase in fluid dynamic power in the inlet air flow stream if the flight Mach Number is increased from Mach=0.8 to Mach=1.5 at a constant altitude.

For this design example and operation at lower altitudes down to sea level, the increase in ambient temperature results in greater acoustic speed and greater flow velocity in the nozzle at a given flow Mach Number. Under Standard Day conditions the acoustic speed at sea level is 19 percent greater than at 48,000 feet due to the greater ambient temperature. If flight speeds of a maximum of Mach= 1.1 are required at sea level, Mach=1.0 flow would be present in the choked nozzle, which when combined with the higher acoustic velocity at sea level represents 48 percent greater nozzle flow velocities and corresponding greater fluid dynamic power into the turbine wheel than under design conditions of Mach=0.8 and 48,000 feet altitude. This increase is to be compared with the approximate 1500 percent increase in fluid dynamic power in the inlet air flow stream for a chance from the design condition of Mach= 0.8 at 48,000 feet to sea level at Mach=1.1. Therefore, for the specific geometry considered and the design condition considered of Mach=0.8, 48,000 feet and the flight conditions considered of Mach=1.5 maximum at 48,000 feet and Mach= 1.1 maximum at sea level, an additional generator capacity of 48 percent will be sufficient to accommodate changes in available fluid dynamic power of the inlet air stream as great as 1500 percent.

Other possible installations of the invention can be envisioned in addition to the forward nose installation illustrated in FIGS. 1, 2, 5A and 5B. In some applications it may be advantageous to install the invention somewhat aft of the nose, the example in cases where it is necessary or desirable to place other equipment in the nose region. In this event other installations are possible, for example as illustrated in FIG. 7. Here, the invention is positioned somewhat aft of the nose region and the annular inlet passage diffuser 32A serves the same function as the inlet diffuser 32 in the nose installation of the invention.

While a preferred embodiment of the invention has been disclosed in detail, it should be understood by those skilled in the art that various other modifications may be made to the illustrated embodiments without departing from the scope of the invention as described in the specification and defined in the appended claims.

What is claimed is:

1. Ram air turbine generating apparatus comprising:

a generally cylindrical external fairing extending between an inlet passage at a leading end and an aft end and having a plurality of bypass exhaust orifices adjacent said leading end and a plurality of external exhaust ports adjacent said aft end;

central flow guide means mounted on said external fairing and coaxial therewith, said guide means having a contoured outer surface spaced from said external fairing;

valve tube means intermediate said external fairing and said central flow guide means and coaxial therewith, said valve tube means extending between a nose end having a plurality of openings therein nearest said leading end of said external fairing and an aft plate spaced from said aft end of said external fairing, said valve tube means having a plurality of aft internal exhaust ports generally coextensive with the aft external exhaust ports in said external fairing;

a turbine wheel drivingly coupled to a generator;

means biasing said valve tube means to a first position whereat said nose end of said valve tube means is proximate said leading end of said fairing and blocks the bypass exhaust orifices therein such that air is caused to flow through the inlet passage, through an annular nozzle defined between said valve tube means and said central flow guide means, through said turbine wheel, then out to the surrounding region through the aft internal exhaust ports and the aft external exhaust ports;

said valve tube means being movable to a second position by the force of air acting on said valve tube means exposing the bypass exhaust orifices such that substantial flow of air occurs therethrough with a lesser flow through the annular nozzle, through said turbine wheel, then out to the surrounding region through the aft internal exhaust ports and the aft external exhaust ports.

2. Ram air turbine generating apparatus as set forth in claim 1 including:

nozzle control means intermediate said valve tube means and said central flow guide means operable to control flow of air through the nozzle in response to movement of said valve tube means between said first and second positions.

3. Ram air turbine generating apparatus as set forth in claim 2 wherein said nozzle control means includes:

a plurality of circumferentially spaced control doors pivotally mounted to said contoured outer surface of said central flow guide means for movement between retracted positions substantially contiguous with said central flow guide means and extended positions projecting into the annular nozzle; and a plurality of links, each of said links being pivotally mounted at one end to said valve tube means and at an opposite end to one of said control doors;

whereby each of said control doors is held in the retracted position when said valve tube means is in the first position; and whereby each of said control doors is held in the extended position when said valve tube means is in the second position.

4. Ram air turbine generating apparatus as set forth in claim 2 including key means for preventing relative circumferential movement between said fairing and said valve tube means as said valve tube means moves between the first and second positions.

5. Ram air turbine generating apparatus as set forth in claim 2 wherein said central flow guide means has an axial bore therein; and wherein said valve tube means has an integral centering shaft slidably received in the axial bore.

6. Ram air turbine generating apparatus as set forth in claim 1 including:

a generator shaft rotatably mounted at one end on said central flow guide means and at the other end on said aft plate of said valve tube means.

7. Ram air turbine generating apparatus as set forth in claim 6 including:

a forward bearing on said central flow guide means for rotatably mounting said one end of said generator shaft; and an aft bearing on said aft plate of said valve tube means for rotatably mounting said other end of said generator shaft, said generator shaft and said aft bearing being slidable relative to each other to accommodate movement of said valve tube means between said first and second positions.

8. Ram air turbine generating apparatus as set forth in claim 1 wherein said biasing means includes at least one compression spring interposed between said aft end of said external fairing and said aft plate of said valve tube means.

9. Ram air turbine generating apparatus as set forth in claim 1 including guide vanes upstream of said turbine wheel for efficiently guiding flow of the air through said turbine wheel.

* * * * *